3,167,465
PROCESS FOR LAMINATING LAYERS OF FABRIC WITH TERPOLYMERS OF ACETYL TRIALLYL CITRATE, MALEIC ANHYDRIDE AND STYRENE
John H. Jaspers, Cincinnati, Ohio, assignor to Miles Laboratories Inc., Elkhart, Ind., a corporation of Indiana
No Drawing. Filed Oct. 24, 1960, Ser. No. 64,286
1 Claim. (Cl. 156—332)

This invention relates to polymeric materials prepared from triallyl citrate and its acylated derivatives. In particular this invention relates to copolymers of triallyl citrate or acyl triallyl citrates, such as acetyl triallyl citrate, with organic carboxylic acids or their anhydrides, such as maleic anhydride, and ethylenically substituted aromatic hydrocarbons, such as styrene.

Triallyl citrate and its acylated derivatives, for example acetyl triallyl citrate, can be polymerized to provide a variety of useful polymeric materials including liquid prepolymers, solid prepolymers and solid thermosetting resins. For many uses the homopolymers prepared by polymerizing acetyl triallyl citrate or related materials are found to have desirable properties. However, for some applications the homopolymers are surpassed by copolymers prepared from these compounds and a variety of olefinic comonomers. For example, high tensile strengths, impact strengths and flexural strengths are properties which are seldom obtainable by mere homopolymerization of these monomers.

Accordingly, it is an object of this invention to provide novel polymeric compositions which have desirable improved properties.

Another object of this invention is to provide polymeric materials characterized by high tensile strength, impact strength and flexural strength.

Another object of this invention is to provide such polymeric materials which may be used in laminated structures.

A further object of this invention is to provide a process for the preparation of such polymeric materials which is conveniently conducted and readily carried out.

Yet a further object of this invention is to provide polymeric compositions having markedly improved physical and chemical properties.

Other objects and advantages of this invention will become apparent in the course of the following detailed disclosure and description.

It has now been found that polymeric materials having extremely dtsirable physical and chemical properties can be prepared by interpolymerization of a mixture of triallyl citrate or an acylated triallyl citrate with an organic carboxylic acid or anhydride thereof, such as maleic anhydride, and an ethylenically substituted aromatic hydrocarbon, such as styrene. In particular, copolymers resulting from the interpolymerization of this mixture of a citrate, an acid, and a hydrocarbon, as the comonomers will hereinafter be referred to, have been found to have excellent tensile strengths, impact strengths, and flexural strengths as well as other desirable properties.

The conditions for the interpolymerization of the mixture of monomers required for forming the novel compositions of this invention consists in using a suitable peroxide catalyst at somewhat elevated temperatures and relatively low pressures. The mixture of monomers is thereby converted to a solid polymeric material having the desired properties. As will be described below the properties of the polymeric product may be enhanced by means of certain preferred laminating techniques.

The proportions of citrate, acid and hydrocarbon used are somewhat critical. In general, from about 40% to 100% of acid and from about 10% to 50% of hydrocarbon based upon the weight of citrate, is used in the polymerization mixture. For example, a composition resulting from the polymerization of acetyl triallyl citrate with 45% maleic anhydride and 15% styrene, based upon the weight of acetyl triallyl citrate, has been found to possess the outstanding properties desired. Other proportions and other acyl triallyl citrates than acetyl triallyl citrate may of course be used depending upon the end use to which the resulting copolymer is to be put. For example, acylated triallyl citrates having acyl groups derived from the following acids may be used: acetic, propionic, butyric, pelargonic, lauric, benzoic, and p-toluic.

Although the hydrocarbon and the acid are generally charged to the polymerization mixture in monomeric form, the citrate may be charged as the monomer itself or as a liquid prepolymer. In many respects the use of a liquid prepolymer is preferred because of the ease of handling and the tendency of the prepolymers to further polymerize upon heating. Prepolymers of triallyl citrate and its acylated derivatives may be prepared by polymerizing the monomer to a limited extent to provide less highly cross-linked polymeric materials of a lower molecular weight than that of solid thermosetting polymers.

For the interpolymerization of the mixture of citrate, acid and hydrocarbon there may be used any of a wide variety of peroxide catalysts. For example, such compounds as benzoyl peroxide, di-tertiary butyl peroxide, di-tertiary butyl perbenzoate, methyl ethyl ketone peroxide and similar materials are effective for this purpose. The catalyst is generally used in an amount of from about 1% to about 10%, and preferably from about 3% to 7% by weight of the citrate charged to the polymerization mixture.

In order to form the copolymers of this invention the monomers are mixed with the catalyst in the desired proportions and polymerized at elevated temperatures and low pressures. For example, a mixture of acetyl triallyl citrate or acetyl triallyl citrate prepolymer, 45% of maleic anhydried, 15% of styrene and 7% of di-tertiary butyl peroxide, based upon the acetyl triallyl citrate or prepolymer, is applied to glass cloth or other laminating fabric over the desired number of laminations, pressed at 70 p.s.i. and 320° F., held for 30 minutes (20 minutes for the prepolymer) and discharged cold. The order of mixing is not critical. However, it is believed to facilitate the interpolymerization if the solid maleic anhydride is first dissolved in the acetyl triallyl citrate or acetyl triallyl citrate prepolymer before adding the styrene and catalyst.

Temperatures of from about 250° F. to 400° F. and pressures of from about 20 p.s.i. to 70 p.s.i. with times of from about 5 minutes to 30 minutes are generally effective, with kiss cycles and precure cycles sometimes being employed.

Other applications include molding or casting the mixture of monomers to form a solid thermosetting resin. Other means of fabricating the novel copolymers of this invention such as the inclusion of inert fillers or coloring materials or the surface treatment of various substrates such as plywood or particle board may also be used to advantage. The low pressure laminating technique described above is particularly adaptable to surface treatment where the use of low pressures within the prescribed range avoids any danger of compressive damage to the substrate.

The invention will be better understood by reference to the following examples which are included for purposes of illustration and are not to be construed as in any way limiting the scope of this invention which is defined in the claim appended hereto.

*Example I*

A quantity of 250 g. of acetyl triallyl citrate was heated to a temperature of 150° F. to 160° F., and 112.5 g. (45% by weight of acetyl triallyl citrate) of powdered maleic anhydride was added. The mixture was thoroughly stirred until the maleic anhydride was dissolved. The mixture was then allowed to cool to room temperature and a mixture of 37.5 g. (15%) of styrene and 17.5 g. (7%) of di-tertiary-butyl peroxide was added.

The mixture was then poured over 12 plies of 12″ x 12″ pieces of glass cloth (181–A1100 Fiberglas Cloth was used, but glass cloth having finishes designated as Volan A or Garan as well as other finishes and other weaves are also satisfactory). The mixture was spread evenly with a spatula to insure even impregnation of each ply. When the 12 laminations had been impregnated the build-up was wrapped in cellophane and rolled with a rubber roller to remove any air pockets. When this had been accomplished the build-up was inserted into a cold press. A pressure of 70 p.s.i. was applied and the press was heated to a temperature of 320° F. and held at this temperature and pressure for 20 minutes. At the end of this time the press was cooled while the pressure was maintained until room temperature was reached. The panel was then removed and subjected to a series of standard tests. The results of these tests are shown below.

Flexural strength—78,720 p.s.i., ASTM D790–58T
Modulus of elasticity—3.57×10$^6$ p.s.i., ASTM D790–58T
Tensile strength—62,820 p.s.i., ASTM D638–58T
Izod impact, notched—24.4 ft. lb./in. of notch, ASTM D256–56
Edgewise compressive—44,170 p.s.i., LP–406b Method 1021
Coefficient of linear thermal expansion, ASTM D696–44:
    200° F.—3.36×10$^{-6}$ in./in./° C.
    300° F.—7.50×10$^{-6}$ in./in./° C.
    400° F.—6.09×10$^{-6}$ in./in./° C.
    500° F.—5.65×10$^{-6}$ in./in./° C.
Volume resistivity—46.4×10$^{13}$ ohm-cm., ASTM D257–58
Surface resistivity—125.50×10$^{10}$ ohms, ASTM D257–58
Arc resistance time—161.7 sec., ASTM D495–58T
Electrical tests at 1 megacycle:
    Power factor—0.0125, ASTM D150–54T
    Dielectric constant—4.03, ASTM D150–54T
    Loss factor—0.0504
Hardness:
    Rockwell "M" scale—92, ASTM D785–51
    Barcol—73
Specific gravity—1.909, ASTM D792–50
Flammability—Non-burning, ASTM 635–56T
Water absorption—0.49%, ASTM D570–57T

*Example II*

The procedure of Example I was followed except that the amount of maleic anhydride was 75% by weight of the amount of acetyl triallyl citrate and the amount of styrene was 20%. The pressure used was 35 p.s.i. The results were as follows:

Flexural strength—81,010 p.s.i., ASTM D790–58T
Modulus of elasticity—3.73×10$^6$ p.s.i., ASTM D790–58T
Edgewise compressive—34,560 p.s.i., LP–406b Method 1021

*Example III*

The procedure of Example I was followed except that instead of acetyl triallyl citrate there was used the same quantity of a prepolymer of acetyl triallyl citrate having the following characteristics: refractive index ($n_D^{20}$)—1.4722, percent unsaturation—81.5%, viscosity—525 cps. The cycle was a 20 minute cycle. The results are shown below.

Flexural strength—79,800 p.s.i., ASTM D790–58T
Modulus of elasticity—3.59×10$^6$ p.s.i., ASTM D790–58T
Tensile strength—61,060 p.s.i., ASTM D638–58T
Edgewise compressive—41,990 p.s.i., LP–406b Method 1021
Izod impact, notched—24.3 ft. lb./in. of notch, ASTM D256–56
Cofficient of linear thermal expansion, ASTM D696–44:
    300° F.—7.72×10$^{-6}$ in./in./° C.
    400° F.—9.44×10$^{-6}$ in./in./° C.
    500° F.—10.15×10$^{-6}$ in./in./° C.
Volume resistivity—57.3×10$^{13}$ ohm-cm., ASTM D257–58
Surface resistivity—149.02×10$^{10}$ ohms, ASTM D257–58
Arc resistance time—163 sec., ASTM D495–58T
Electrical tests at 1 megacycle:
    Power factor—0.0121, ASTM D150–54T
    Dielectric constant—3.77, ASTM D150–54T
    Loss factor—0.0456
Hardness:
    Rockwell "M" scale—103, ASTM D785–51
    Barcol—82
Specific gravity—1.857, ASTM D792–50
Flammability—Non-burning, ASTM D635–56T
Water absorption—0.44%, ASTM D570–57T In summary there are provided by this invention novel copolymers of triallyl citrate or acylated triallyl citrates with organic carboxylic acids or anhydrides and ethylenically substituted aromatic hydrocarbons which have outstanding physical and chemical properties.

What is claimed is:

A process for the preparation of a low pressure laminate which comprises applying to a plurality of layers of laminating fabric a mixture comprising acetyl triallyl citrate, from about 40% to 100% of maleic anhydride, from about 10% to 50% of styrene, and from about 1% to 10% of a peroxide catalyst, said percentages being based upon the weight of acetyl triallyl citrate, and pressing the layers of coated laminating fabric together at a pressure of from about 20 p.s.i. to 70 p.s.i. at a temperature of from about 250° F. to 400° F. for a period of time of from about 5 minutes to 30 minutes, to interpolymerize the mixture of acetyl triallyl citrate, maleic anhydride and styrene.

References Cited in the file of this patent
UNITED STATES PATENTS

| | | |
|---|---|---|
| 2,273,891 | Pollack et al. | Feb. 24, 1942 |
| 2,340,110 | D'Alelio | Jan. 25, 1944 |
| 2,361,019 | Gerhart | Oct. 24, 1944 |
| 2,408,690 | Seymour | Oct. 1, 1946 |
| 2,409,633 | Kropa | Oct. 22, 1946 |
| 2,545,184 | Whitehill et al. | Mar. 13, 1951 |
| 2,647,886 | Seymour | Aug. 4, 1953 |
| 2,923,692 | Ackerman et al. | Feb. 2, 1960 |
| 3,025,271 | Borchert | Mar. 13, 1962 |